United States Patent

[11] 3,558,028

| [72] | Inventor | Leslie J. Bunting<br>Rochester, N.Y. |
|---|---|---|
| [21] | Appl. No. | 819,769 |
| [22] | Filed | Apr. 28, 1969 |
| [45] | Patented | Jan. 26, 1971 |
| [73] | Assignee | Eastman Kodak Company<br>Rochester, N.Y.<br>a corporation of New Jersey |

[54] CONTROL DEVICE FOR SELF-THREADING MOTION PICTURE PROJECTOR
4 Claims, 4 Drawing Figs.

[52] U.S. Cl. .................................................... 226/91,
242/192, 242/209; 352/158
[51] Int. Cl. .................................................... G03b 1/58
[50] Field of Search ......................................... 226/89, 91,
92; 352/158, 157; 242/192, 209

[56] References Cited
UNITED STATES PATENTS

| 3,208,682 | 9/1965 | Pastor et al. ................ | 226/91(X) |
| 3,429,518 | 2/1969 | McKee ....................... | 226/91(X) |

*Primary Examiner*—Richard A. Schacher
*Assistant Examiner*—Gene A. Church
*Attorneys*—Robert G. Hampton and G. Herman Childress

ABSTRACT: A self-threading cartridge loaded motion picture projector is equipped with a simple mechanical control device which latches the film stripping and threading elements of the projector in their respective operative positions. When the leading end of the film has entered the film gate and has been engaged by a film-advancing member, the control device is unlatched in response to the resulting tensioning of the film between the gate and the supply reel, thereby causing the stripping and threading elements to be returned automatically to their respective inoperative positions so that the film can be projected.

PATENTED JAN 26 1971

LESLIE J. BUNTING
INVENTOR.

BY J. Herman Childers

Robert W. Hampton

ATTORNEYS

PATENTED JAN 26 1971

LESLIE J. BUNTING
INVENTOR.

BY G. Herman Childress
Robert W. Hampton
ATTORNEYS

CONTROL DEVICE FOR SELF-THREADING MOTION PICTURE PROJECTOR

REFERENCE TO RELATED APPLICATIONS

Reference is hereby made to commonly assigned application Ser. No. 685,616 entitled "Cinematographic Projectors or the Like and Cartridges for Use Therewith," filed in the names of John J. Bundschuh and Robert J. Roman on Nov. 24, 1967.

BACKGROUND OF THE INVENTION

1. Field of the Invention

The present invention relates to self-threading cartridge loaded motion picture projectors of the type disclosed in commonly assigned application Ser. No. 685,616, entitled "Cinematographic Projectors or the Like and Cartridges for Use Therewith," filed in the names of John J. Bundschuh and Robert J. Roman on Nov. 24, 1967. More particularly, the invention relates to the provision of such a projector with a simple mechanical control device which retains the film stripping and threading mechanism in operative condition until the film-threading operation is completed and then automatically disables that mechanism.

2. Description of the Prior Art

The film stripping and threading mechanism incorporated in the type of cartridge loaded motion picture projector disclosed in the above-identified application includes a drive member which is movable to an operative position at which a longitudinally movable endless belt member is in peripheral engagement with a roll of film wound onto a supply reel and thereby imparts unwinding rotation to that roll. A stripper finger is also moved into peripheral engagement with the film supply reel to separate the leading end of the film from the reel and to guide it along a predetermined threading path partially defined between the stripper finger and the belt member. By this means, the leading end of the film is caused to enter the film gate of the projector, where it is engaged by a pulldown claw or other equivalent film-advancing member which thereafter advances its intermittently through the film gate.

Upon completion of the film-threading operation, i.e. upon engagement of the film by the film-advancing member, the drive member and the stripper finger must be moved out of peripheral engagement with the film roll before the film is displayed. In the projector disclosed in the aforementioned U.S. Pat. application, this is accomplished by means of a latch mechanism which retains the drive member and the stripper finger in their respective operative positions until the latch member is released by a solenoid actuated by a sensitive switch adapted to detect the arrival of the film at a location beyond the film-advancing member. Such an arrangement, however, is relatively expensive due to the electrical solenoid and switch components involved. Furthermore, in certain instances it may be desirable to disable the film-threading mechanism manually, for which no provision is made in the previously identified disclosure.

SUMMARY OF THE INVENTION

The present invention provides a simple and reliable mechanical control device adapted to be incorporated in the above-described type of projector without requiring significant modification of any of the other operative components thereof. In response to manual movement of an operating member, the film stripping and threading elements are moved to their respective operative positions where they are releasably retained in engagement with the film roll by a latch member of the control device. When the threading mechanism has caused the leading end of the film to enter the film gate and to be engaged by the film-advancing claw, the latch member is released in response to the resulting tensioning of the film between the gate and the film supply reel, thereby causing the drive member and the stripper finger to move out of engagement with the film. Additionally, the latch member of the subject control device can be released manually at any time by means of the same operating member employed to initiate the film-threading operation.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DESCRIPTION OF THE ILLUSTRATIVE PREFERRED EMBODIMENT

GENERAL DESCRIPTION

Figure 1:
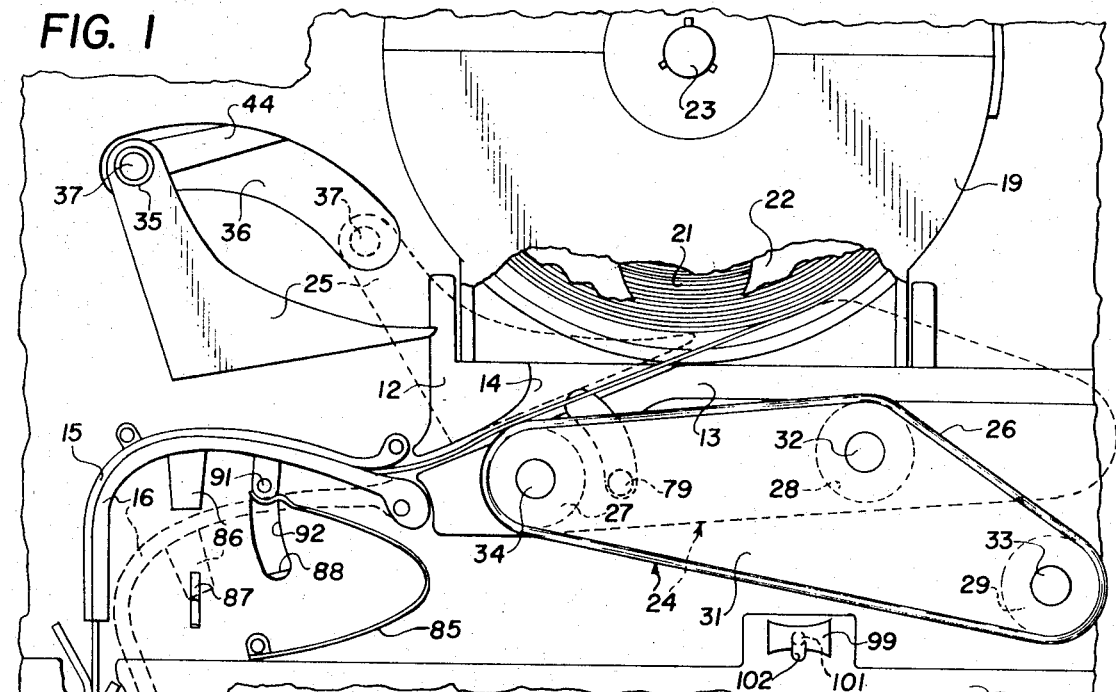
FIG. 1 is a side elevational view of a portion of a self-threading cartridge loaded motion picture projector incorporating a preferred embodiment of the present invention.

The cartridge-loaded projector partially illustrated in the accompanying drawings is basically the same as the one described more specifically in the above-identified application Ser. No. 685,616, but omits various components of the previously disclosed machine which do not relate directly to understanding the present invention. It will be understood, however, that such components are completely compatible with the subject control device and have been deleted from the present disclosure only for purposes of clarity.

Briefly, the illustrative projector comprises a vertical frame plate 11 including film guide bosses 12 and 13 which define a film guide channel 14 leading into a film passageway defined between stationary guide shoe 15 and pivotal guide shoe 16. The lower end of the film passageway defined between the two guide shoes is located directly above a generally conventional film gate 17 provided with a film-advancing member depicted by pulldown claw 18. As shown at numeral 19, the projector is adapted to be loaded with a film cartridge releasably attached to frame plate 11. Within the cartridge, a roll of film 21 is wound onto a film supply reel 22, which is supported for rotation by the rotatable spindle 23.

When the film cartridge initially is mounted on the projector, the leading end of the film must be separated from the film roll and fed along the path defined by the film guide bosses and the guide shoes in order that it will enter the film gate and will be engaged by the film pulldown claw, which thereafter propels it automatically into engagement with the hub of the film takeup reel, not shown. As previously mentioned, this operation is performed by a film stripping and threading mechanism comprising drive member 24 and stripper finger 25.

Drive member 24 comprises an endless elastic belt 26 of circular cross section encircling three pulleys 27, 28 and 29 supported in coplanar relation to one another between two parallel pulley support plates, one of which is shown at 31 in FIG. 1. Pulleys 28 and 29 are freely rotatable about their respective pivot studs 32 and 33 extending between the two support plates. Pulley 27, however, is supported by a drive shaft 34, which is constantly driven by appropriate drive means, not shown, thereby causing that pulley to rotate constantly in a counterclockwise direction as viewed in FIG. 1 or in a clockwise direction as viewed in FIGS. 2, 3 and 4. The two pulley support plates are journaled to the drive shaft adjacent opposite faces of pulley 27 and thereby allow the drive member to pivot between its inoperative position shown in solid lines in FIG. 1 and an operative position at which its moving belt 26 is in pivotal engagement with the roll of film on reel 22, as shown in broken lines in that same FIG. Accordingly, when the drive member is moved to an operative position, as described below, it imparts unwinding rotation to the film roll.

Stripper finger 25 is pivotally supported by a sleeve member 35 extending through an elongate slot 36 in frame plate 11. The sleeve member in turn is supported by a pin 37 on stripper arm 38 which is pivotally mounted on stud 39. Guide roller 41 on pin 37 engages the arcuate edge 42 of stationary cam plate 43 to assist in maintaining arm 38 in parallel relation to plate 11 as the arm rotates arcuately about stud 39. Cam follower arm 44 is also carried by sleeve member 35 in fixed angular relation to the stripper finger and includes a cam follower lip 45 biased toward cam surface 46 on the cam plate by a spring 47. Accordingly, as the stripper arm pivots about stud 39 to move the stripper finger into contact with the film roll, the initial path of movement of stripper finger is determined by cam surface 46. Thus, regardless of the size of film roll 21, the lower edge of the stripper finger will assume a position generally parallel to the adjacent portion of the drive belt when both the finger and the belt are engaged with the film roll, thereby defining the film passageway leading into channel 14. In operation, the film roll is rotated in an unwinding direction by the belt and the film roll is engaged by the stripper finger so that the leading end of the film engages the finger and is thereby separated from the roll and delivered along the threading path.

Figure 2:
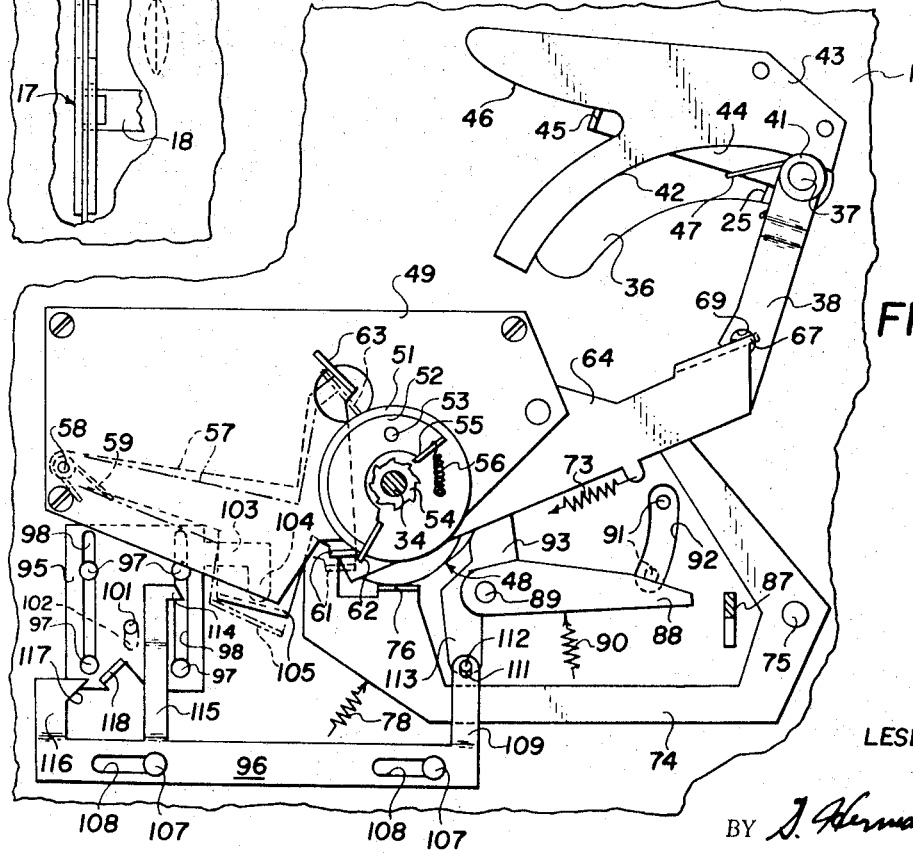
FIG. 2 is an elevational view of the portion of the projector shown in FIG. 1, taken from inside the projector to show the arrangement of internally located components of the film stripping and threading mechanism in association with a control device according to the present invention.
Figure 3:
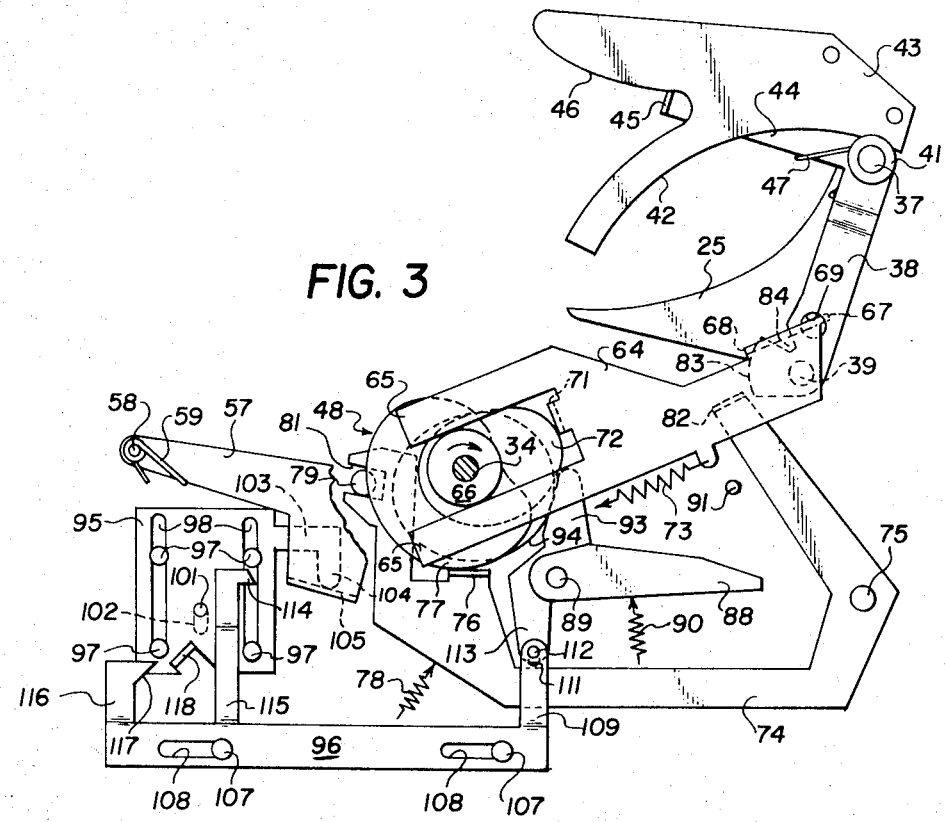
FIG. 3 is a somewhat schematic view from the same viewpoint as FIG. 2, depicting the relative positions assumed by the various illustrated elements of the film stripping and threading mechanism and of the subject control device prior to or following completion of the film stripping and threading phase of the operating cycle of the projector.
Figure 4:
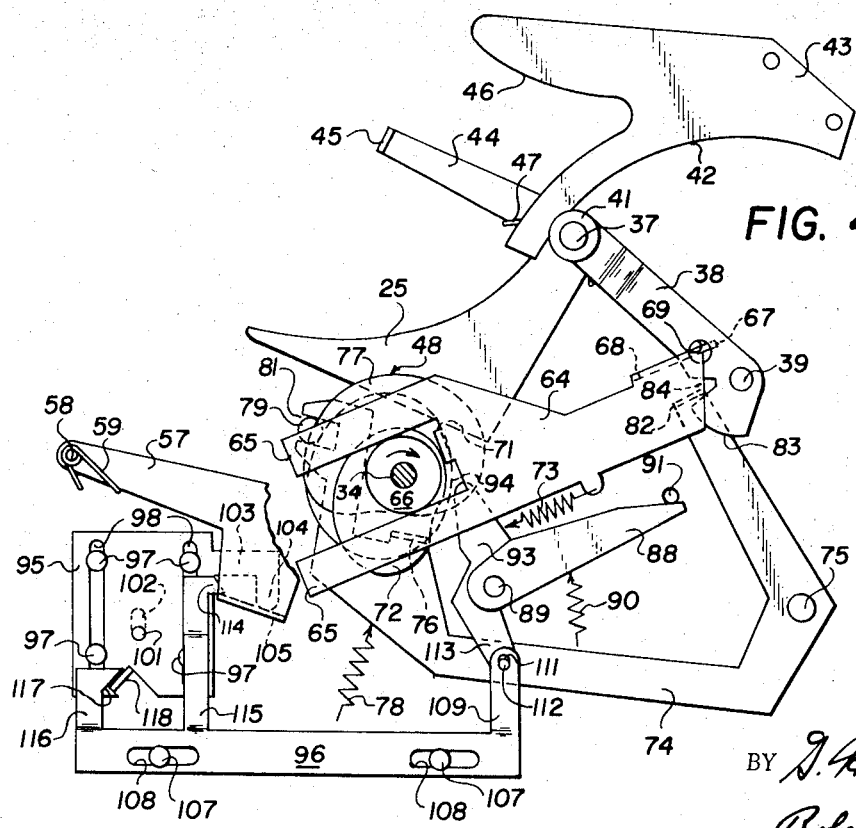
FIG. 4 is a view similar to FIG. 3 and shows the relative positions of the illustrated elements during the film stripping and threading phase of the operating cycle of the projector.

The mechanism employed to move the drive member and the stripper member sequentially into engagement with the film roll is illustrated in FIGS. 2, 3 and 4 and comprises a three-lobed cam member 48 rotatably supported on drive shaft 34 between frame plate 11 and carrier plate 49. Disc member 51 is attached to cam member 48 and carries a dog member 52 pivotally supported by pin 53. A toothed hub member 54 is affixed to drive shaft 34 adjacent disc member 51 and is adapted to be engaged by ear 55 of the dog member, which is biased toward the hub member by a spring 56. A clutch-operating lever 57 is pivoted to plate 49 by pin 58 and is biased upwardly by spring 59. When the clutch-operating lever is in its raised position shown in solid lines in FIGS. 2 and 3, its lower ear 61 is in contact with the edge of disc 51 and engages lip 62 projecting outwardly from dog member 52. Consequently, the dog member is held in its depicted position with its ear 55 out of engagement with hub member 54, thereby disengaging the cam member from the drive shaft so that the cam member remains stationary. Upon movement of the clutch-operating member to its depressed position shown in broken lines in FIG. 2, ear 61 disengages lip 62 as ear 63 simultaneously moves downwardly into contact with the disc member. Accordingly, dog member 52 immediately pivots about pin 53 under the influence of spring 56 to engage ear 55 with hub member 54, thereby coupling the cam member to drive shaft 34. As soon as the cam has rotated through an angle of approximately 120°, however, the corresponding rotation of disc 51 brings lip 62 into contact with ear 63, whereupon the cam member is again immobilized at its intermediate position by the disengagement of the dog ear from the hub member. Thereafter, movement of the clutch operating member back to its former position similarly causes the cam member to be driven through an angle of approximately 240° to restore it to its initial position.

The position of stripper arm 38 is determined by cam member 48 by means of slide bar 64, which is supported at one end by legs 65 straddling cam hub 66 and at its opposite end by an L-shaped ear 67 extending beyond lip 68 and received in hole 69 in stripper arm 38. Cam follower ear 71, located between the legs of the slide bar, is urged toward engagement with the periphery of cam lobe 72 by spring 73. Similarly, the position of drive member 24 is controlled by the cam member through the agency of control lever 74, which is pivoted to support stud 75 and provided with a cam follower ear 76 biased toward engagement with cam lobe 77 by spring 78. A positioning stud 79, rigidly attached to the drive member, is received in a slot 81 at the corresponding end of the control lever, thereby correlating the position of the drive member with that of the control lever.

Except during the film stripping and threading operation, the cam member is angularly oriented as shown in FIGS. 2 and 3 by the engagement of the lower cam follower ear 61 with dog member lip 62, whereby the drive member and the stripper finger are retained in their respective inoperative positions. Upon movement of the control lever to its lower position shown in broken lines in FIG. 2, and in solid lines in FIG. 4, the resulting rotation of the cam member to its intermediate position depicted in the latter FIG. allows slide bar 64 to effect movement of the stripper finger into operative engagement with the film roll. Simultaneously, cam lobe 77 also presents a decreasingly smaller radius to cam follower ear 76 of control lever 74. At the opposite end of that lever, an ear 82 thereon is in alignment with the curved edge surface 83 of stripper arm 38. Therefore, as the cam member commences its rotational movement from its initial position, lever 74 is blocked by the engagement of ear 82 with surface 83, allowing cam lobe 77 to move out of engagement with cam follower ear 76. By the time the cam member reaches its intermediate position, however, the movement of stripper arm 38 by slide bar 64 has brought the stripper finger to its operative position and has aligned notch 84 in the stripper arm with ear 82. Thus, since ear 82 is no longer blocked, spring 78 can now pivot the slotted end of the control lever upwardly to thereby rotate the drive member about shaft 34 into resilient driving engagement with the film roll within the film cartridge.

During the projection of the film, the lower film guide shoe 16 is free to pivot downwardly against the influence of a relatively weak leaf spring 85 to absorb momentary fluctuations in film tension. The trailing end of the film is attached to the film supply reel so that the film is drawn taut between the gate and that reel when all of the available film has been displayed. When this occurs, the lower guide shoe is pivoted to its lowermost position shown in broken lines in FIG. 1 so that its foot member 86 engages and depresses trigger member 87 to initiate the rewinding of the film by effecting automatic adjustment of a rewind mechanism, not shown, which opens the film gate and imparts film rewinding rotation to the film supply reel. During the film stripping and threading operation, however, the lower guide shoe must be retained in its raised position with greater force than that afforded by spring 85 in order to insure that the leading end of the film strip will be guided positively into the film gate. This is accomplished by means of snubber arm 88, which is biased upwardly about pivot pin 89 by spring 90 to urge it toward engagement with pin 91 projecting from the lower guide shoe through arcuate slot 92 in frame plate 11. A cam follower ear 93 on arm 88 is adapted to engage lobe 94 on cam member 48, which holds the arm in its inoperative position shown in FIGS. 1, 2 and 3 whenever the cam member is in its initial position. As the cam member rotates to its intermediate position, as previously described, the decreased radius of the portion of cam lobe 94 adjacent cam follower ear 93 allows spring 90 to pivot arm 88 upwardly into contact with pin 91 so that the lower film guide shoe is urged upwardly under the combined force of springs 85 and 90.

CONTROL DEVICE

In accordance with the present invention, the position of clutch-operating lever 57 is established by a control device comprising operating slide 95 and latching slide 96.

The operating slide is supported for vertical sliding movement by rivets 97 extending through elongate slots 98 therein and is movable manually by means of slide button 99 carried by pin 101 projecting through vertical slot 102 in the frame plate. Arm 103 extends laterally from the operating slide with its depending nose 104 positioned above lip 105 of the clutch-operating lever so that manual downward movement of the slide button moves that lever to its lower position in opposition to spring 59 to initiate rotation of the cam member from its initial position to its intermediate position.

Latching slide 96 is supported for horizontal sliding movement by rivets 107 extending through horizontal slots 108 and includes a vertical tongue 109 provided with an elongate hole 111 which receives a pin 112 carried by tongue 113 of snubber arm 88. Accordingly, when the cam member is in its initial position, the corresponding angular location of the snubber arm positions the latching slide as shown in FIGS. 2 and 3. In this position, latch tooth 114 at the top end of vertical arm 115 of the latching slide is beyond the arcuate path of movement of lip 105 of the clutch operating lever.

When the operator manually depresses slide button 99, the clutch-operating lever is pivoted downwardly, as previously explained, thereby initiating rotation of the cam member to its intermediate position. As such rotation proceeds, cam lobe 94 pivots snubber arm 88 to the position shown in FIG. 4, as also explained above, and in so doing moves latching slide 96 to the position shown in that same FIG. so that latch tooth 114 engages lip 105 and holds the clutch-operating lever in its lower position in opposition to spring 59. Thus, as soon as such engagement of tooth 114 with lip 105 has been established, the operator can release slide button 99 without interrupting the continuing performance of the film stripping and threading operation.

During the film stripping and threading operation, the lower film guide shoe is maintained adjacent the upper film guide shoe under the combined influence of springs 85 and 90 to establish a passageway along which the film is directed through the film gate. When the completion of the film stripping and threading operation has brought the leading end of the film into engagement with claw 18, the longitudinal movement imparted to the film by the claw exceeds the rate at which the film can be unwound from the film roll by the engagement of the slower moving drive belt with the film. Therefore, sufficient tension is developed in the film between the gate and the film cartridge to pivot guide shoe 16 downwardly by overpowering both leaf spring 85 and also spring 90, which biases the snubber arm cam follower ear toward engagement with the cam member. Before guide shoe 16 is thus pivoted downwardly to the position at which it initiates the film-rewinding operation, however, the accompanying rotation of the snubber arm displaces the latching slide to disengage tooth 114 from lip 105; thereby allowing spring 59 to raise the clutch operating lever so that the cam member will return to its initial position by completing a single revolution. Therefore, the illustrated mechanism is restored automatically to the condition depicted in FIGS. 1, 2 and 3 to allow the projection of the film to proceed.

To enable the operator to discontinue the film stripping and threading operation manually, latching slide 96 includes a release arm 116 provided with a sloped cam face 117, which is positioned immediately adjacent the correspondingly sloped cam lip 118 on operating slide 95 when the projector mechanism is adjusted to the condition shown in FIG. 4. If the operator manually lifts slide button 99, the upward movement of the operating plate therefore causes cam lip 118 to cam the latching slide out of latching engagement with lip 105 of the clutch-operating lever in opposition to spring 90. Consequently, the clutch-operating lever is returned to its raised position by spring 59 to enable the cam member to restore the mechanism to its initial condition in the same manner previously described.

Although the operating slide and the latching slide are both slidably supported in the above-described embodiment of the invention, it should be apparent that functionally similar corresponding members could be pivotally mounted to further simplify the control device for production purposes.

The invention has been described in detail with particular reference to preferred embodiments thereof, but it will be understood that variations and modifications can be effected within the spirit and scope of the invention.

I claim:

1. In a motion picture projector including:
   a. means for supporting a film supply roll comprising an elongate strip of film having a leading end,
   b. a film advancing member engageable with said film to move the same away from said roll,
   c. a threading device adapted to deliver the leading end of said strip of film from said roll to said film-advancing member, said device being adjustable
      1. to a first condition out of engagement with said film supply roll and
      2. to a second condition wherein said threading device is engaged with said film supply roll,
   d. an operating member movable to a first position and to a second position to adjust said threading device respectively to said first and second conditions thereof,
   e. resilient means biasing said operating member toward said first position, and
   f. latch means adapted to releasably latch said operating member in said second position, the improvement comprising;
   g. film tension sensing means adapted to sense the tension of a portion of said strip of film extending from said film supply roll into engagement with said film-advancing member, and
   h. latch release means operable by said film tension-sensing means to release said latch means from latching engagement with said operating member in response to the occurrence of a predetermined tension in the portion of said strip of film between said film supply roll and said film-advancing member.

2. In a motion picture projector including:
   a. means for supporting a film supply roll comprising an elongate strip of film having a leading end,
   b. a film-advancing member engageable with said film to move the same away from said roll,
   c. a threading device adapted to deliver the leading end of said strip of film from said roll to said film advancing member, said device being adjustable
      1. to a first condition out of engagement with said film supply roll and
      2. to a second condition wherein said threading device is engaged with said film supply roll,
   d. a rotating drive shaft,
   e. a rotatable cam member,
   f. a releasable clutch adapted to couple said cam member rotatively with said drive shaft,
   g. a clutch-operating member movable between a first position and a second position to effect rotation of said cam member by said drive shaft to predetermined initial and intermediate rotative locations corresponding respectively to said first and second positions of said clutch-operating member,
   h. threading control means operated by said cam member for adjusting said threading device,
      1. to said first condition in response to rotation of said cam member to said initial rotative location and
      2. to said second condition in response to rotation of said cam member to said intermediate rotative location, the improvement comprising;
   i. a control member movable manually from a first location to a second location to move said clutch operating member from said first position to said second position,
   j. a latch member movable into operative latching engagement with said clutch-operating member at said second position thereof in response to rotation of said cam member from said initial rotative location toward said intermediate rotative location to releasably retain said clutch-operating member in said second position, and k. a film tension-sensing mechanism engageable by a portion of said strip of film between said film supply roll and said film-advancing member, said film tension-sensing mechanism being adapted to move said latch member out of operative latching engagement with said clutch-operating member in response to predetermined tensioning of a portion of said film between said film-advancing member and the supply roll and while said threading device is still in said second condition.

3. The invention defined by claim 2 including manual latch disengagement means adapted to release said latch member from operative latching engagement with said clutch operating member at said second position thereof in response to manual movement of said control member from said second location to said first location.

4. The invention defined by claim 2 in which said film tension sensing mechanism comprises:

a. a film guide member supported for movement between
  1. a threading position at which said film guide member defines a first film path between said film supply roll and said film-advancing member and
  2. a latch release position at which said film guide member defines a shorter second film path between said film supply roll and said film-advancing member,
b. resilient means biasing said film guide member toward said threading position, and
c. means for moving said latch member out of operative latching engagement with said clutch-operating member in response to movement of said film guide member to said latch release position in opposition to said resilient means under the influence of tension developed in said strip of film between said film supply roll and said film-advancing member.